United States Patent [19]

Naito et al.

[11] Patent Number: 4,967,348
[45] Date of Patent: Oct. 30, 1990

[54] DATA NAME STANDARDIZING SYSTEM

[75] Inventors: Ichiro Naito; Takahiko Kobayashi, both of Tokyo; Hiroyuki Maezawa, Tama, all of Japan

[73] Assignees: Hitachi, Ltd.; Hitachi Microcomputer Engineering, both of Tokyo, Japan

[21] Appl. No.: 271,728

[22] Filed: Nov. 15, 1988

[30] Foreign Application Priority Data

Nov. 20, 1987 [JP] Japan .................. 62-292177

[51] Int. Cl.⁵ .............................................. G06F 15/20
[52] U.S. Cl. ................................ 364/200; 364/237.2; 364/286; 364/286.1
[58] Field of Search ........................ 364/200, 300, 900

[56] References Cited

U.S. PATENT DOCUMENTS 4,445,177 4/1984 Bratt et al. .................. 364/200

OTHER PUBLICATIONS

K. Bannai, M. Suzuki and T. Terano, "A Total Approach to a Solution for the Maintenance Problems through Configuration Management—Maintenance Support Facility MSF—", Compsac 83 Proc., (Nov. 1983), pp. 404–411.

J. Weldon, "Data Base Administration", Plenum Press, (1981), pp. 179–181.
R. M. Curtice, "Data Dictionaries: An Assessment of Current Practice and Problems", 7th International Conference of VLDB Proc., (1981), pp. 564–570.
F. E. Allen and J. Cocke, "A Program Data Flow Analysis Procedure", C. ACM, vol. 19, No. 3 (Mar. 1976), pp. 137–147.

Primary Examiner—Raulfe B. Zache
Attorney, Agent, or Firm—Fay, Sharpe, Beall, Fagan, Minnich and McKee

[57] ABSTRACT

A data name standardizing/unifying system for standardizing the names of data belonging to data items having different names and transferred or compared among data files so as to be unified for programs. For standardizing the data names, names of data items assumed to have same contents are gathered and a table indicating data names to be replaced are generated to be displayed together with prompting for entry of the standard data name to replace. From this table, standardization for data names is accomplished by this replacement of the data name in the programs. For identifying the standardized data names created for the different files, different file names or different and upper file names are added to a division of program which refers to the files.

12 Claims, 10 Drawing Sheets

| PROGRAM NAME | DATA NAME | COLUMN | LENGTH | FILE NAME | DATA NAME | COLUMN | LENGTH | FILE NAME |
|---|---|---|---|---|---|---|---|---|
|  |  |  |  |  |  |  |  |  |
| PROGRAM 0 | I-TOTAL | 2 | 6 | FILE A | SUM | 3 | 6 | FILE D |
|  |  |  |  |  |  |  |  |  |
| PROGRAM 1 | I-TOTAL | 2 | 6 | FILE A | O-TOTAL | 4 | 6 | FILE B |
|  |  |  |  |  |  |  |  |  |
| PROGRAM 2 | G-TOTAL | 2 | 6 | FILE A | TOTAL | 4 | 6 | FILE C |

F I G. 5

| GROUP 1 | | | |
|---|---|---|---|
| PROGRAM NAME | FILE NAME | DATA NAME | COLUMN |
| PROGRAM 0 | FILE A | I-TOTAL | 2 |
| PROGRAM 0 | FILE D | SUM | 3 |
| PROGRAM 1 | FILE A | I-TOTAL | 2 |
| PROGRAM 1 | FILE B | O-TOTAL | 4 |
| PROGRAM 2 | FILE A | G-TOTAL | 2 |
| PROGRAM 2 | FILE C | TOTAL | 4 |

PLEASE ENTER STANDARD DATA NAME OF GROUP 1 IN PARENTHESIS ([TOTAL])

FIG. 6

| PROGRAM NAME | FILE NAME | DATA NAME | STANDARD DATA NAME |
|---|---|---|---|
| | | 27 | 28 | 26 |
| PROGRAM 0 | FILE A | I-TOTAL | TOTAL |
| PROGRAM 0 | FILE D | SUM | TOTAL |
| PROGRAM 1 | FILE A | I-TOTAL | TOTAL |
| PROGRAM 1 | FILE B | O-TOTAL | TOTAL |
| PROGRAM 2 | FILE A | G-TOTAL | TOTAL |
| PROGRAM 2 | FILE C | TOTAL | TOTAL |

DATA NAME STANDARDIZING SYSTEM

BACKGROUND OF THE INVENTION

The present invention generally relates to an intra-/inter-program data name (identifier) standardization support system for an information processing equipment and more particularly to the intra-/interprogram data name standardization system suited profitably for enhancing efficiency of maintenance activity and productivity of software including one or plural programs for performing data processing with a plurality of files.

Processing or replacement of data flow in the information processing apparatus is described in R. M. Curtice, "Data Dictionaries: An Assessment of Current Practice and Problems", 7th International Conference of VLDB Proc., pp. 564–570 (1981); F. E. Allen, and J. Cocke, "A Program Data Flow Analysis Procedure", C. ACM, Vol. 19, No. 3 (March 1976), pp. 137–147; K. Bannai, M. Suzuki, and T. Terano, "A Total Approach to a Solution for the Maintenance Problems through Configuration Management - Maintenance Support Facility MSF -", Compsac 83 Proc. (Nov. 1983), pp. 404–411; and J. Weldon, "Data Base Administration", Plenum Press, (1981), pp. 179–181.

Software, in particular the software destined for business data processing is generally constituted by a number of program for performing data sending/reception or data transfer with files. Consequently, in the program maintenance activity, it is important to appreciate the contents or meanings of data items in order to comprehend the programs.

Further, when the attributes of a data item such as the digit number (data length) and the data types (such as data representation by numerals or by characters, the number of bits used for representing one digit or figure, representation by punctuated numeral and so forth) are to be changed for some reason associated with the maintenance activity, it is necessary to alter or modify correspondingly a plurality of programs which use the data items having the same content as the first mentioned data item. Further, it is equally important to make clear completely what data item is used by what program. In this conjunction, it will readily be appreciated that operator in charge of maintenance of the programs encounters difficulty in finding out the data items of the same content when the intra-file data items (i.e. data items in a file) are assigned with different names or identifiers from one to another program. Even when such a tool is available which can present information concerning the correspondence relations between a plurality of programs and data names, it is still difficult to ascertain which of data items is used by which of programs.

To solve the problems mentioned above, a method or system has been proposed in which a standardized data name is prepared for a data item in a given one of files, wherein the names of data in different programs which correspond to the data item of the given file are replaced and unified by the standardized data name. In that case, in order to ascertain that the data items having names differing from one to another programs are identical with one another, it is necessary to check manually for each of the data items whether the data item used by different programs with different names occupies a same location in a same file and/or whether the data items used by the different programs have the same contents or meanings.

As will be seen, the prior art data name standardization (or unification) system mentioned above can certainly unify the names of a data item in one file used in common by a plurality of programs by replacing with a standardized name. However, no consideration is paid to such situation in which the name of the data item having the same content differs from one to another file. Consequently, when data items having the same content are present in a plurality of files and when the names of these data items of the same content are to be unified by a standardized name throughout the plural files with the aid of the prior art procedure mentioned above, it is then required to decide the identity of the data items of concern one by one for all the files through intervention of operator, which is however very difficult in practice. In other words, when data items of same content exist in a plurality of files, it has heretofore been impossible to make decision as to the identity of these data items and to unify the names thereof with a standardized name for the programs which use these data items. This in turn means that when data items having inherently the same content are present in a plurality of files, it is difficult to appreciate through the programs the fact that these data items have the same content. It is further noted that when data items of same content are present in a plurality of files and when the attributes such as digit number and data type (numerical data, character data or plus or minus numerical data) of a data item existing in one file are to be altered or modified, it is necessary to modify correspondingly the attributes of the data items of the same content in other files. However, it has been impossible to pick up all the data items whose attributes are to be altered even when the tool capable of providing information about the correspondence relations between the data names and the programs is available, unless the data items of concern are used by the programs under the identical data name.

SUMMARY OF THE INVENTION

An object of the present invention is to solve the problems of the prior art system described above and to provide a data name standardizing system which is so arranged as to decide the identity of data items having same content among a plurality of files and replace the data names of the data items by a standardized data name unified for a plurality of programs.

Another object of the present invention is to provide an intra-/inter-program data name standardizing system which can enhance the efficiency of maintenance work involved in detecting a program required to be altered or modified in correspondence with alteration of the data name and new interpretation of contents of the data for that program.

A further object of the present invention is to provide a system for performing decision as to the identity of the content for the data items in plural files referred to by programs, extraction of the data items and replacement of the names thereof by a standardized data name unified for the programs.

A still further object of the present invention is to provide a system in which appreciation of programs as well as retrieval of a division of the program to be altered by making use of information concerning the correspondence relations between the data names and programs and hence the software maintenance activity can be accomplished with enhanced efficiency to thereby allow a program using the data of concern to be easily found out.

The intra/inter-program data name standardizing system according to the present invention is based on the recognition that those data items whose data are transferred or compared among a plurality of files can basically be decided to be the data items having the same content or meaning.

In view of the objects mentioned above, there is provided according to a general aspect of the present invention an intra/inter-program data name standardzing system in which means is provided for analyzing data flow in a program to thereby identify cr decide that the data transferred or compared among the files are the data having same content. The intra/inter-program data name standardizing system according to the invention further includes means for finding out those divisions (corresponding or relevant portions as used) of the individual programs which refer to or use the data item decided as having the same content by the decision means, and means for replacing the names of data retrieved by the finding means by a standardized data name unified for the programs through designation by user or in accordance with rules.

With the system arrangement described above, it is possible to automatically identify those data items having the same content by detecting a group of data items mutually transferred or compared by analyzing the data flows in programs. Further, by virtue of the means for detecting those divisions of the programs which use the relevant data corresponding to those to be assigned with the standardized name through designation by the user or in accordance with the data name determining rules, the names of data items existing in a plurality of files and having the same or identical content can automatically be replaced by a standardized data name unified for the plural programs.

DESCRIPTION OF THE PREFERRED EMBODIMENT

Now, the invention will be described in conjunction with exemplary embodiments thereof by reference to the accompanying drawings.

Figure 1:
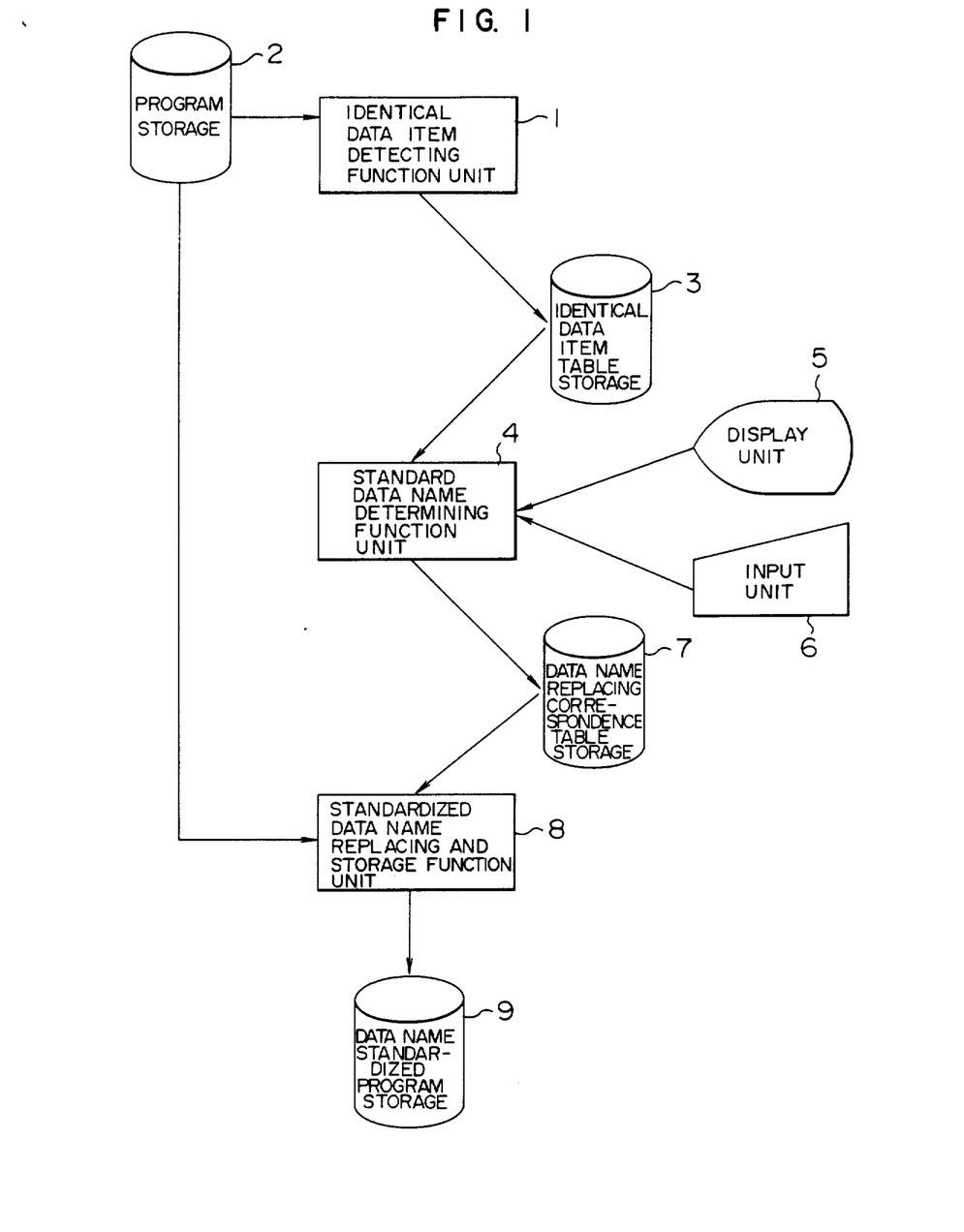
FIG. 1 is a schematic diagram showing a general arrangement of the data name standardizing system according to an embodiment of the present invention.
Figure 2:
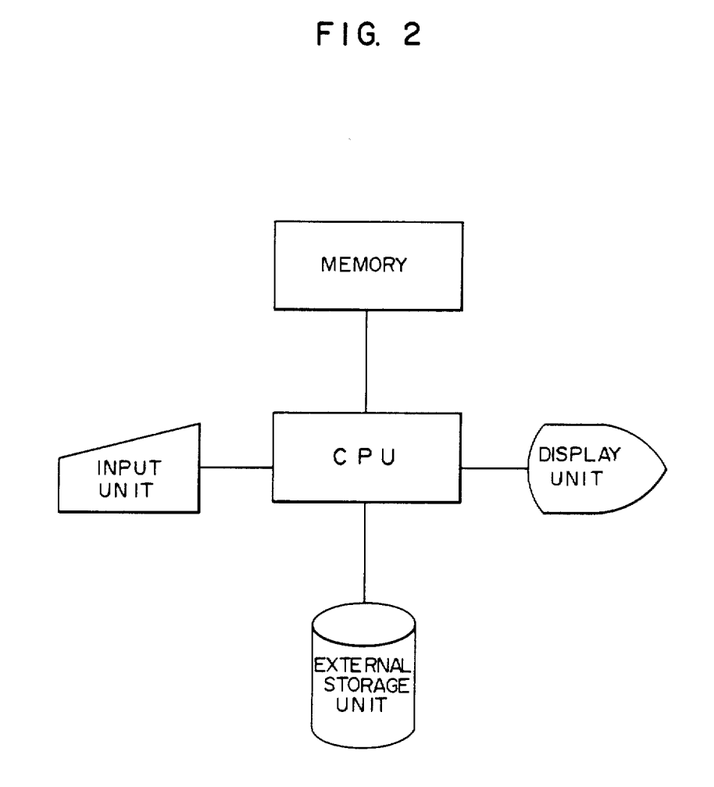
FIG. 2 is a block diagram showing a hardware environment in which the data name standardizing system according to the invention can be used.

FIG. 1 shows a functional arrangement of the data name standardization support system according to an embodiment of the present invention, and FIG. 2 shows a hardware environment in which the data name standardization support system according to the instant embodiment can be used and which includes a central processing unit (CPU), an input unit, a main memory, an external storage equipment and a display unit. Referring to FIG. 1, the inter-program data name standardization support system according to the instant embodiment comprises an identical data item detecting function unit 1, a program storage 2, an identical data item table storage 3, a standard data name determining function unit 4, a diaplay unit 5, an input unit 6, a data name replacing correspondence table storage 7, a standardized data name replacing and storage function unit 8 and a data name standardized program storage 9. The interprogram data name standardization support system now under consideration is realized on the assumption that the system is used in such a software environment in which file names or identifiers are used in common by a plurality of programs. The identical data item detecting function unit 1 analyses the programs stored in the program storage 2 to find or retrieve the data items whose data undergo mutual transfer and comparison among the files, wherein the data names (identifier), intra-file column positions and/or data length of the data items as retrieved as well as the names of the files and programs which contain the data items of concern are registered in the identical data item table storage 3.

Figure 3:
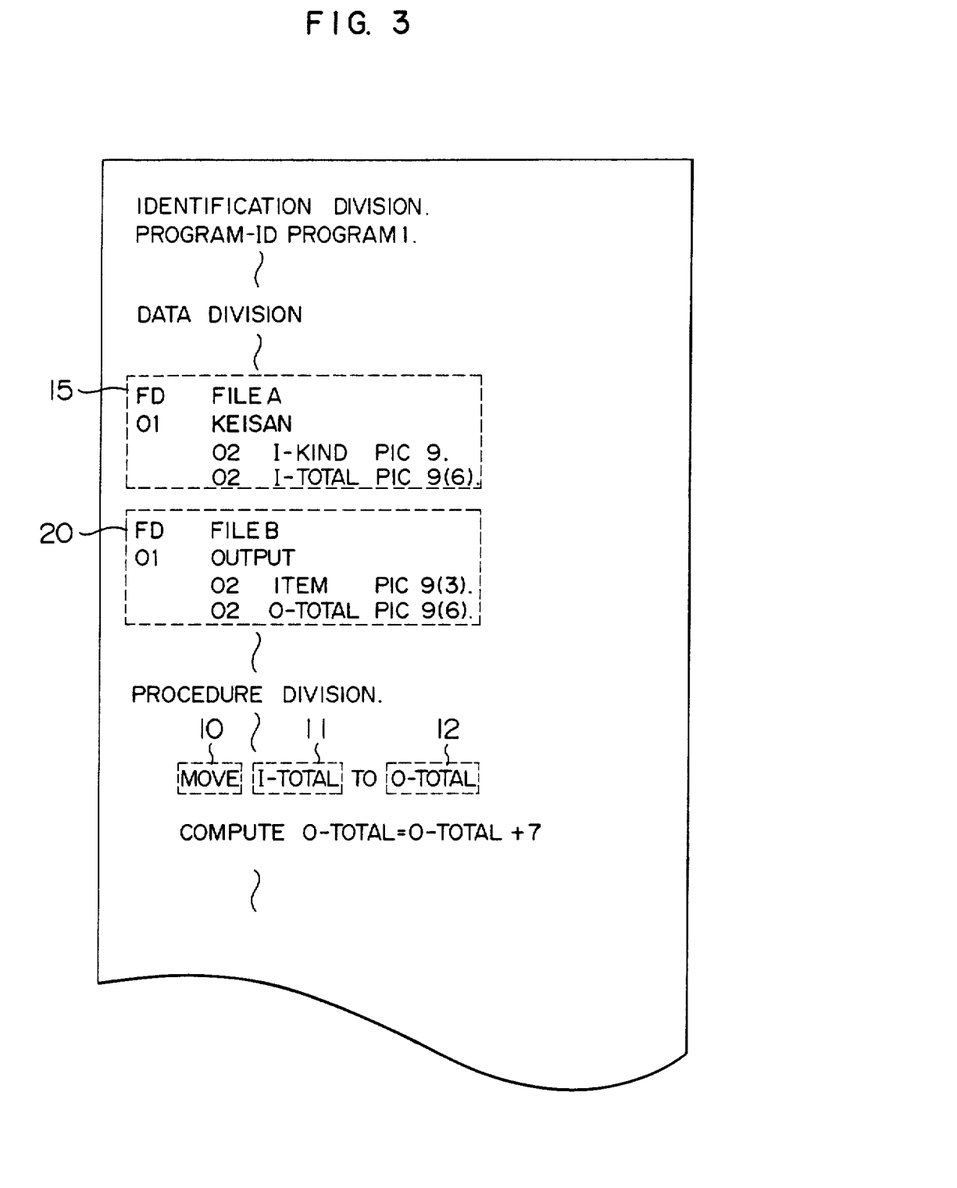
FIG. 3 is a view illustrating an example of an existing program.
Figure 4:
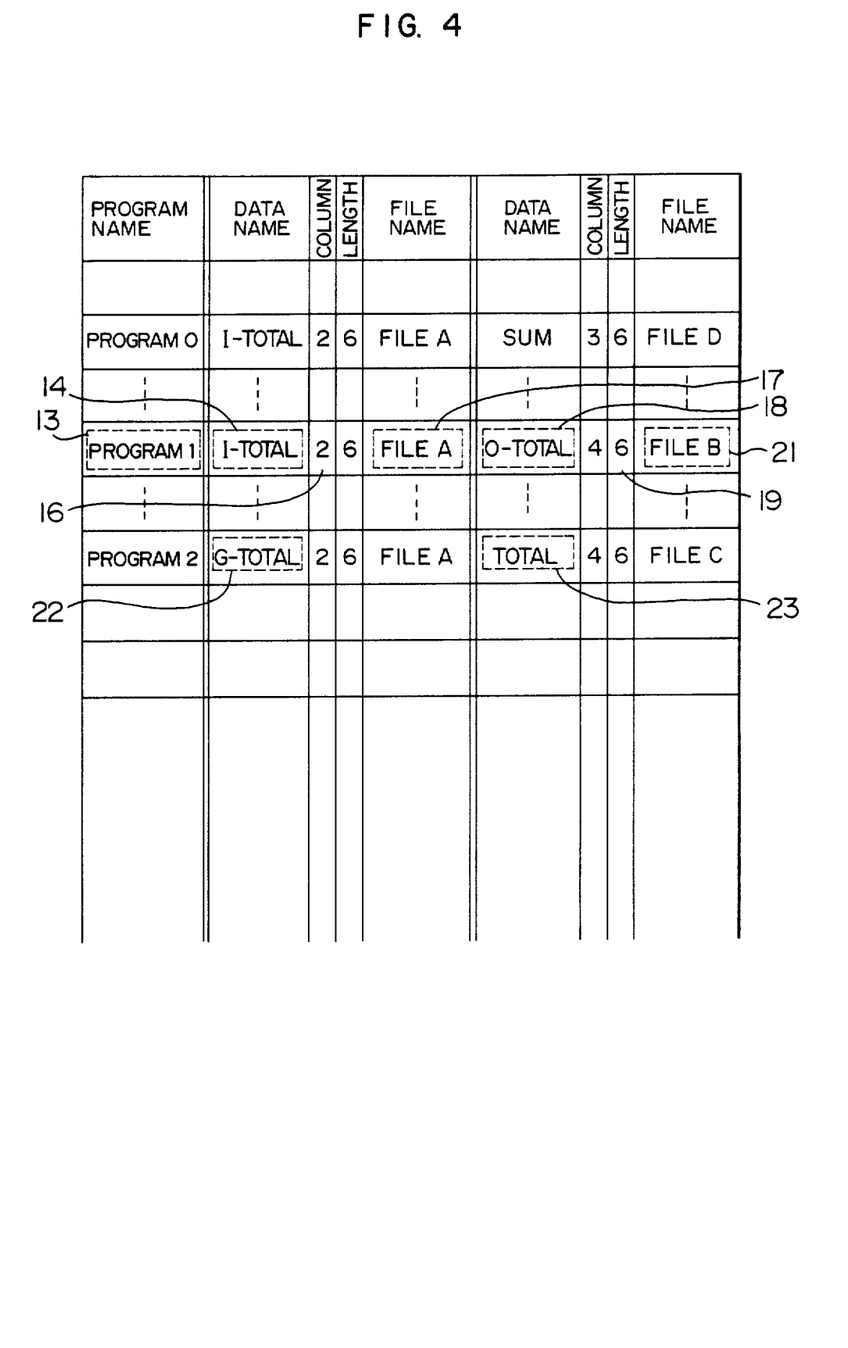
FIG. 4 is a view showing, by way of example, an identical data table.
Figure 5:
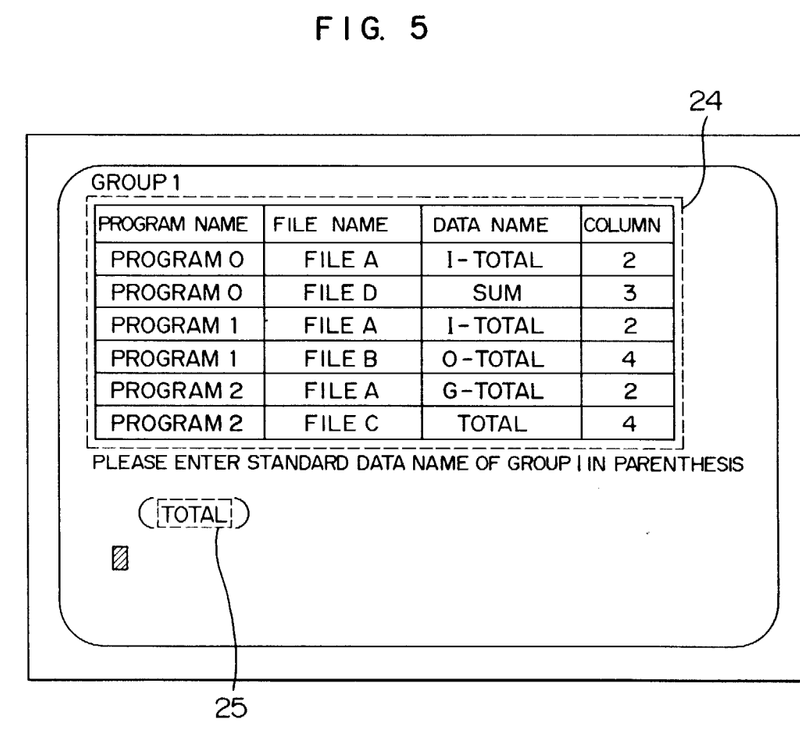
FIG. 5 is a view showing an example of information generated by a display unit.

FIG. 3 shows an example of the program stored in the program storage 2, and FIG. 4 shows an example of the identical data item table stored in the identical data item table storage 3 for four files. In the case of the example of program illustrated in FIG. 3, the identical data item detecting function unit 1 analyzes the program to find out a command 10 for data transfer and recognizes that the data items 11 and 12 are identical with each other in respect to the data content. By way of example, data "I-TOTAL" of a file A located in an area 11 of the program and a data item "0-TOTAL" of a file B located in an area 12 bear simply a move relation to each other a indicated by the command "MOVE" 10. Accordingly, it is allowed to make decision that these data "I-TOTAL" and "0-TOTAL" are of the same content. Referring to FIG. 4, the object for analysis, i.e. the program name such as, for example, "PROGRAM1" is registered in an area 13, while the data name, e.g. "I-TOTAL" of the data item 11 is registered in an area 14. Further, on the basis of file data definition 15 shown in FIG. 3, it is arithmetically determined that the data item 11 is present in a file named "FILEA" at the second column thereof wherein the column position "2" together with the data length "6" are entered at an area 16 in the identical data table shown in FIG. 4. Further, the name of the file containing the data item 11, i.e. "FILEA" in this case, is registered at an area 17 of the table shown in FIG. 4. Parenthetically, data definition "PIC 9" indicates that the data of concern is represented by the one digit. In the similar manner, the data name "0-TOTAL" of the data item 12 is registered at an area 18 in the identical data table shown in FIG. 4, there are three digits (ITEM) before the data 0-TOTAL (see a block 20), the column position "4" and the digit number "6" of the data 12 calculated on the basis of the file data definition 20 shown in FIG. 3 are registered at an area 19, and the name of the file "FILEB" containing the data 12 is registered at an area 21. In conjuction with the definition "PIC 9(6)" shown in FIG. 3, the parenthesized numeral "6" indicates that the data is represented by a six digit number. As will be seen in FIG. 4, the data item "0-TOTAL" in the area 18 is located on the same line as the data item "I-TOTAL" in the area 14. This means that the former is of the same content (meaning) as the latter. In the same sense, data "G-TOTAL" registered at an area 22 can be decided as having the same content as the data "TOTAL" placed at an area 23. The data "G-TOTAL" at the area 22 and the data "I-TOTAL" at the are 14 belong to the same file "FILEA" and are identical with each other in respect to the column position and the data length. In conjunction with the decision of identity of the data items in one and the same file (FILEA) which is referred to by different programs (PROGRAM1 and PROGRAM2), it is to be noted that according to the teaching of the invention incarnated in the instant embodiment, those data items which occupy the same column position and/or have the same digit number (i.e. same data length) are identical in respect to the data set even when the data names thereof differ from each other. Namely, in this case the four data items are identical. Accordingly, in the case of the embodiment now under consideration, it can be decided that the data items named "I-TOTAL", "0-TOTAL", "TOTAL" and "G-TOTAL" registered at areas 14, 18, 23 and 22, respectively, are of the same data content although I-TOTAL, 0-TOTAL and TOTAL belong to different files. According to another embodiment of the invention, it is also possible to determine the identity of the data items only on the basis of the sameness in the column position in one file. The standard data name determining function unit 4 classifies the data items stored in the identical data item table storage 3 into a group consisting of the data items of the same content, which group is registered to be displayed on the display unit 5. In that case, the data names to be replaced are displayed on the display unit 5 together with the relevant program names, the file names and the column positions, as is illustrated in FIG. 5. Additionally, the standard data name determining function unit 4 registers in the data name replacing correspondence table storage 7 the standard data names for the groups of the data items classified on the basis of the data contents as mentioned above together with the program names for the grouped data items, file names and the data names. In that case, the standard data names may be inputted by the user through the input unit 6. As an example of the automatic identity decision for the data items based on the comparison among the programs as analyzed, there can be mentioned two-element comparison in condition part of the "IF" statement.

Figure 6:
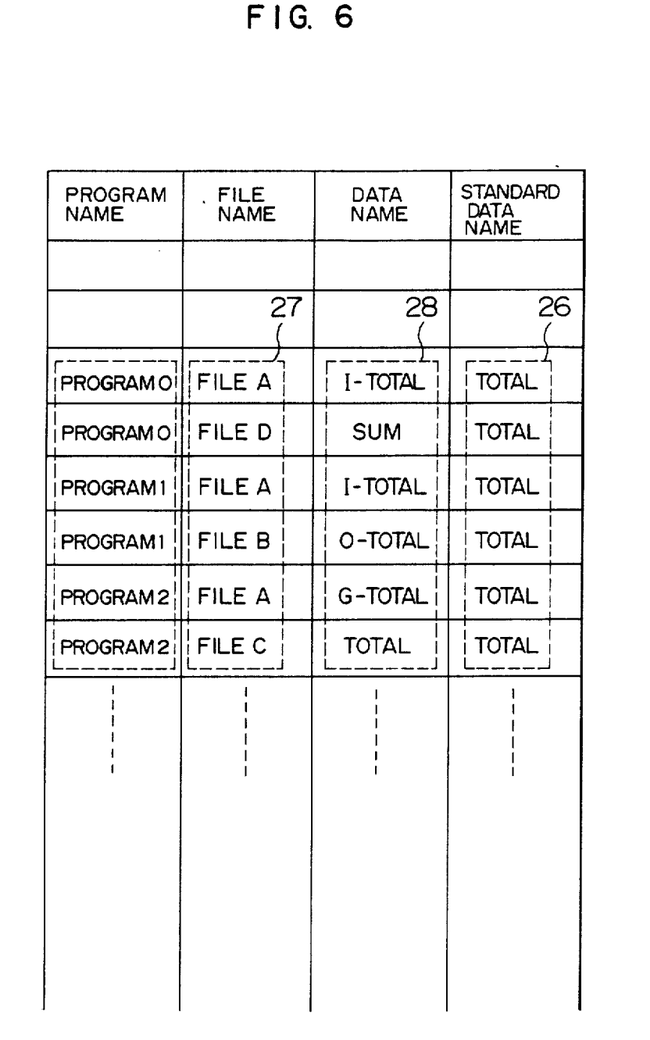
FIG. 6 is a view illustrating an example of correspondence table for replacement of data names.

FIG. 5 illustrates, by way of example, a display 24 of the data names for the data items having some content which is generated on the group basis on the display unit 5, wherein user has inputted a standard data name 25, and FIG. 6 shows an example of the data name replacing correspondence table (i.e. table indicating correspondence relation between data names to be replaced and the standardized data name to replace) which table is stored in the data name replacing correspondence table memory 7 through the medium of the standard data name determining function unit 4. More specifically, of the data items stored in the identical data item table storage 3 shown in FIG. 4, those data items whose contents ar recognized to be identical and whose names are to be standardized are classified into one group by the standard data name determining function unit 4 to be displayed, as shown at 24 in FIG. 5. On the basis of the information of the identical data items displayed on the display unit 5, user can input the standardized data name "TOTAL", as shown in FIG. 5. Additionally, the user may check whether the displayed data items have actually the same or identical content by observing the displayed information.

Referring to FIG. 6 which shows the data name replacing correspondence table, the standard data name "TOTAL" inputted by the user is entered in an area 26 of the table. Further, the names or identifiers of the data items whose names are to be replaced by the standardized data name are registered in an area 28, while the names (identifiers) of the files containing these data items are registered in an area 27. The standard data name replacing function unit 8 finds out or retrieves the data items registered in the data name replacing correspondence table shown in FIG. 6 which is stored in the data name replacing correspondence table storage 7 from the programs of concern stored in the program storage 2 with the aid of the data names and the file names used in these programs to thereby rewrite or replace the nemes (identifiers) of the relevant data in the programs to or by the standard data name registered in the data name replacing correspondence table, wherein the resulting rewritten programs are stored in the data name standardized program storage 9 shown in FIG. 1.

Figure 7:
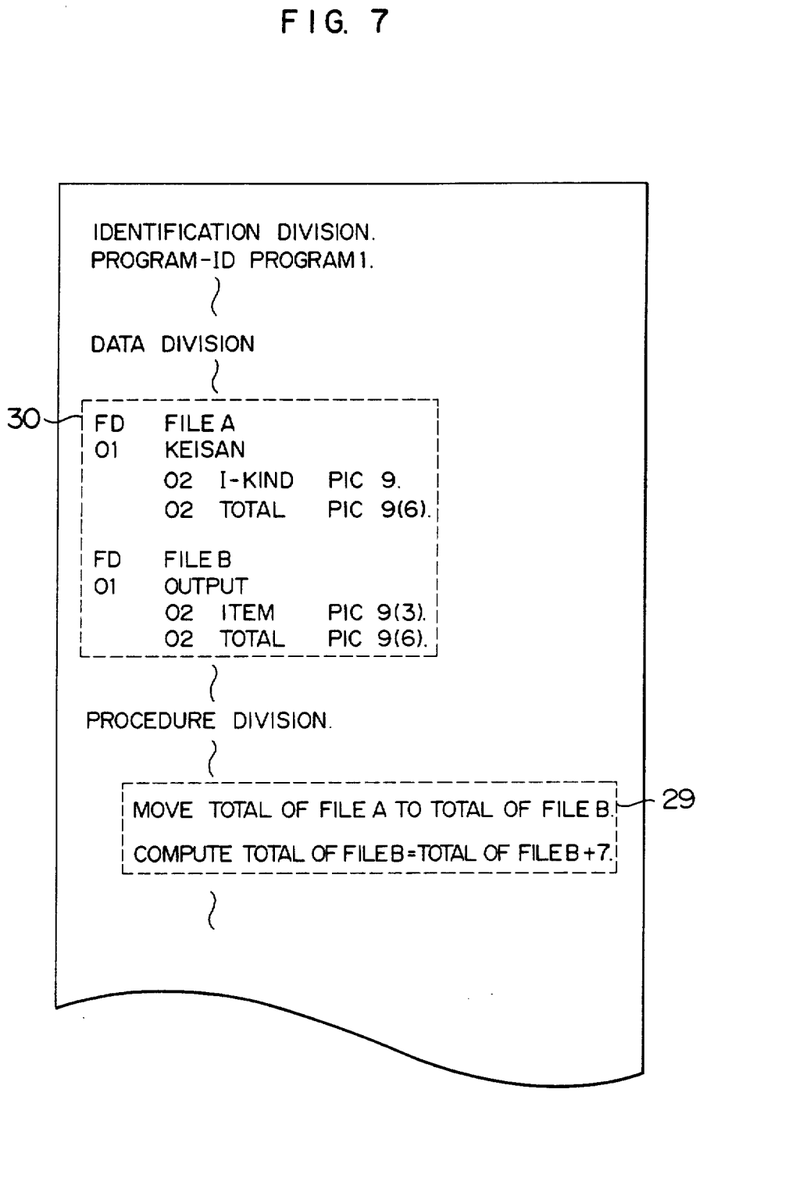
FIG. 7 is a view illustrating an example of program having data names replaced by a standardized one.

FIG. 7 shows an example of the program resulting from the data name replacing or standardizing processing performed for the program shown in FIG. 3. As will be seen in FIG. 7, the names of all the data items which are objectives for the procedure division 29 and the data division 30 are replaced by the standardized data name "TOTAL". File identifiers "OF FILEA" and "OF FILEB" are affixed with a view to discriminatively identifying the corresponding file names. Further upper names such as KEISAN (KEISAN means calculation) or OUTPUT can be used instead of these file identifiers, since they include the standardized data and are unique in each of the FILES A and B.

Figure 8:
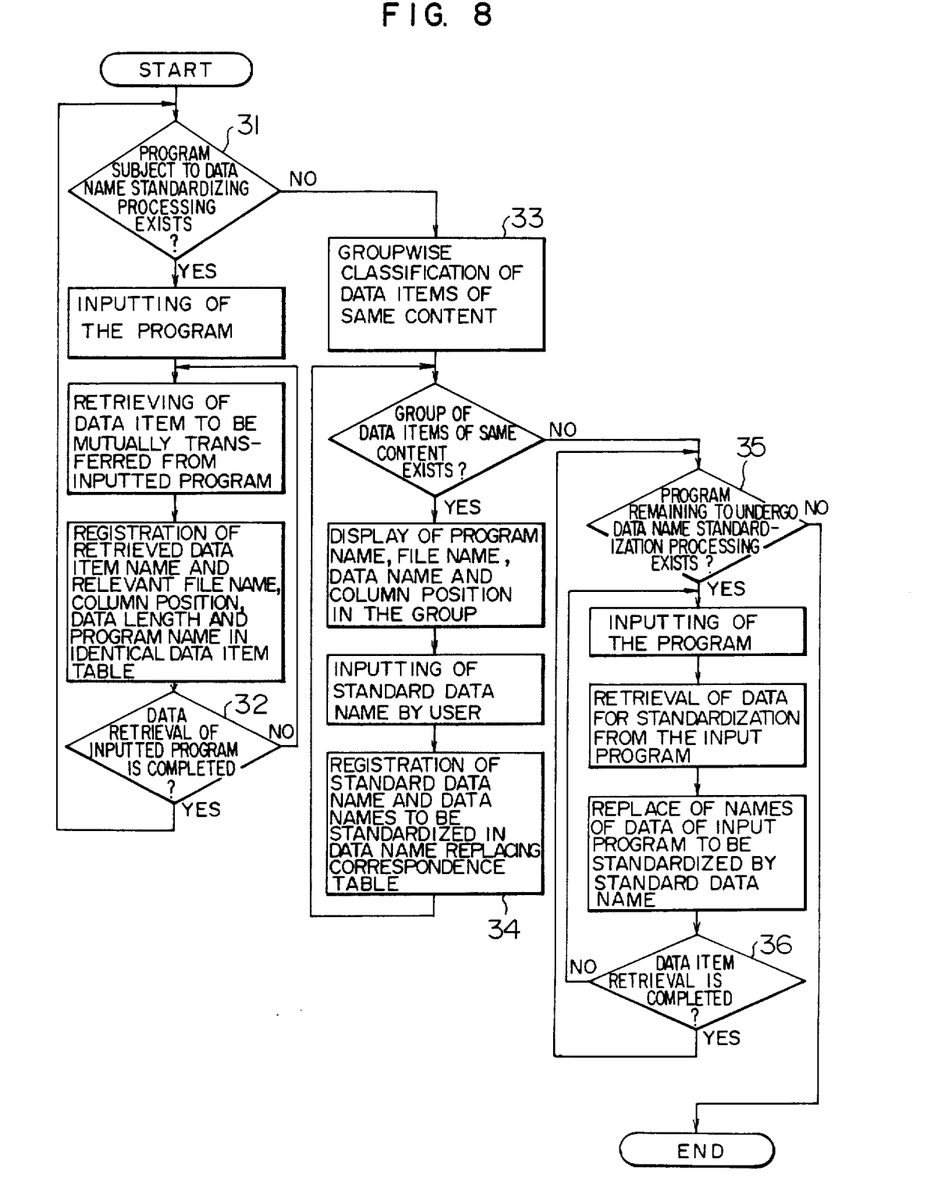
FIG. 8 is a flow chart illustrating algorithm used in an embodiment of the present invention.

FIG. 8 is a flow chart for illustrating an algorithm for realizing standardization of the data names for a plurality of source programs in an information processing system. In this figure, a routine including the processing steps 31 to 32 corresponds to the function of the identical data item detecting function unit 1 shown in FIG. 1, and a routine including the processing steps 33 to 34 corresponds to the function of the standard data name determining function unit 4. Further, a routine including the processing steps 35 to 36 corresponds to the function of the standardized data name replacing function unit 8 shown in FIG. 1.

By replacing the names of the data items having the same content by a standardized data name, comprehension of programs is facilitated. Besides, by adopting the known method of outputting the correspondence table indicating the relations between the names of data items and the programs which refer to the data items, it is possible to detect the progrrams required to be modified in association with modification or alteration of the attributes of the data items referred to by them.

In conjunction with the embodiment shown in FIG. 1, it has been described that the identical data item detecting function unit 1 is arranged to detect or identify only those data items to be mutually transferred or compared straight forwardly as the data items having the same content. It should however be appreciated that such identification or detection can also be made to the data transferred in the form of interim data without difficulty by adopting the data flow analysis technique known per se. Further, a group of the data items to be transferred which differ from one another in respect to the digit number and the attributes of the data or a group of those data items which can not be decided as having the same content because of changes in the content in the course of transfer may be extracted to be displayed to the user for inquiring him or her whether the data items have the same content or whether the names of them should be replaced by a standardized data name, to thereby allow the user to identify and designate the data items having the same content.

Figure 9:
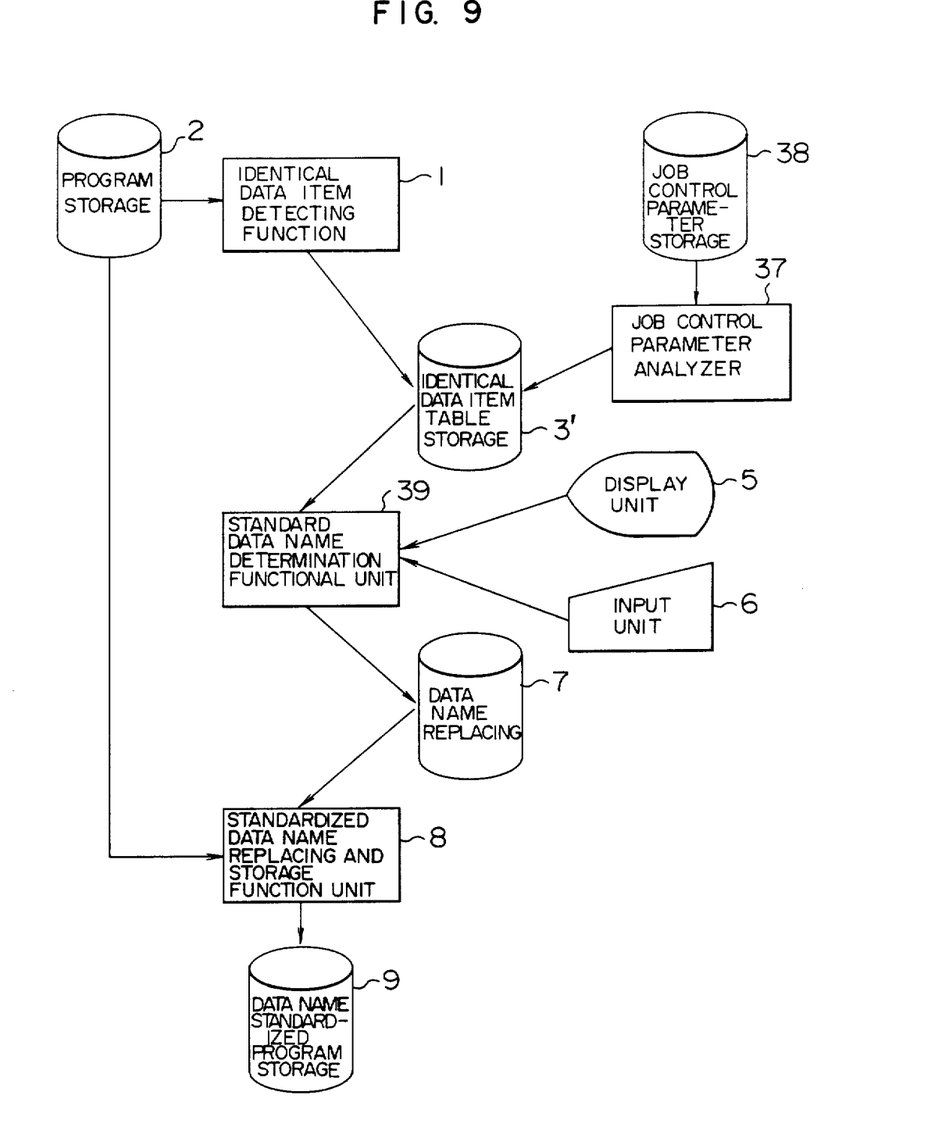
FIG. 9 is a schematic diagram showing an arrangement of another embodient of the invention applied to a hardware environment in which a same file is referred to by a plurality of programs with different file names.

In the foregoing description, such software environment has been presumed in which the individual programs refer to a same file with the identical file name. However, even in such software environment in which the programs can refer to the identical file with respective different file names, the invention can be easily carried out when there is available information such as job control parameters, command procedures and others which can relate the physical file names and logical names of the files used by the programs to each other. In that case, a function for analyzing the abovementioned information and a function for grouping the data items in accordance with the data content may be provided in association with the identical data item table in the embodiment described above. An exemplary functional arrangement to this end is shown in FIG. 9, in which same parts as those shown in FIG. 1 are denoted by like reference numerals and repeated description of them is omitted. The job control parameter analyzer 37 analyzes the job control parameters in the job control parameter storage 38 to add the logical file names and the physical file names of the data sets of concern to the entries of the identical data item table 3' on the program basis. The standard data name determining function unit 39 recognizes the physical names of the file from the identical data item table 3' to thereby display a corresponding command to the user. In other respects, the arrangement shown in FIG. 9 is same as that shown in FIG. 1.

Figure 10:
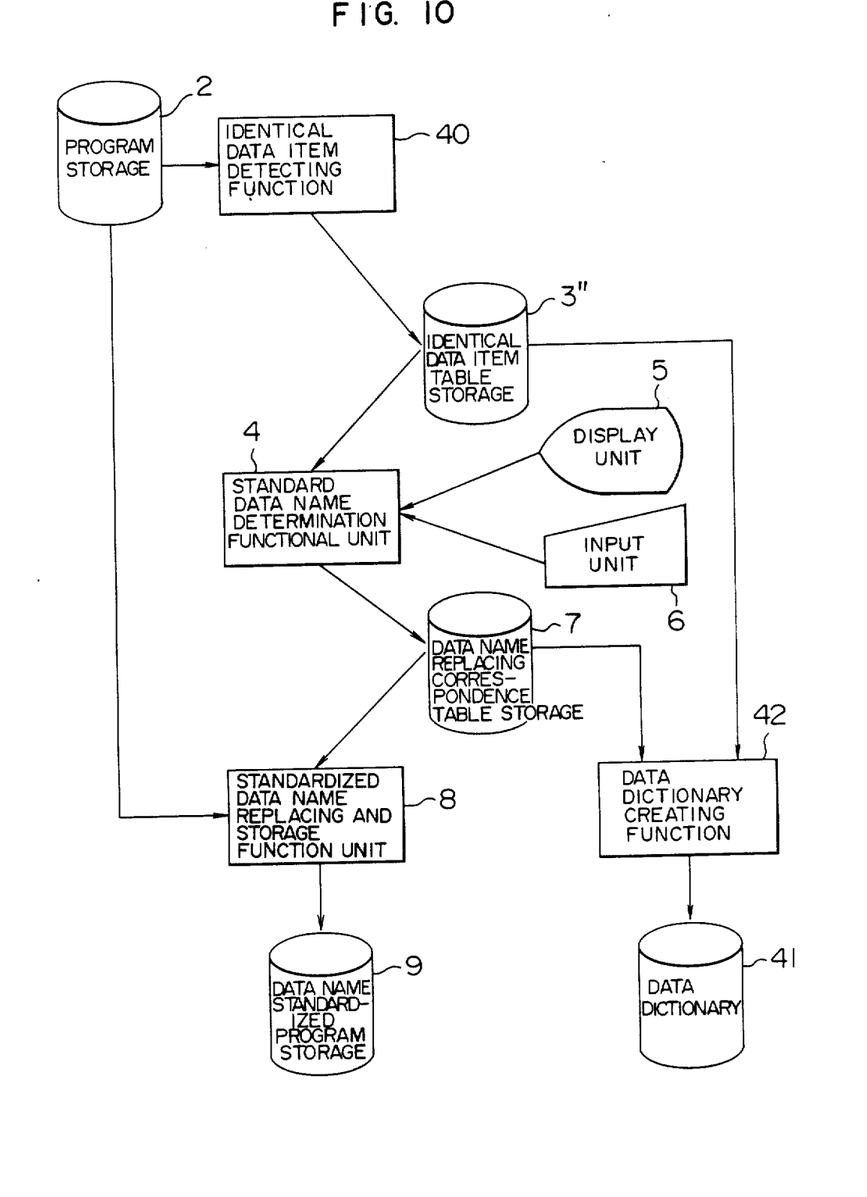
FIG. 10 is a schematic diagram showing another embodiment of the invention incorporating additionally a data dictionary creating function.

Further, by providing additionally a function for creating a data dictionary for storing the standardized data names as well as the digit numbers of the data and the attributes such as the types mentioned hereinbefore, the unified or consolidated data management functions of the data dictionary known per se, i.e. function of displaying a whole list of data items to be used by software of concern and function of mutual reference between the data in the data dictionary and programs can be utilized to further facilitate the maintenance activity for software. FIG. 10 shows functionally an arrangement of such system. Differences from the system shown in FIG. 1 are seen in that there are provided additionally a function of extracting the digit number and the attributes such as the types of data of concern along with the relevant names or identifiers of the data items to store the extracted information in the identical data item table 3'' and a data dictionary creating function 42 for registering the attributes of the data items registered in the identical data item table 3'' and the standard data name registered in the standardized data name replacings correspondence table 7.

We claim:

1. A system for standardizing names of data used by a program running on information processing equipment by analyzing contents of said program, the system comprising:
   (a) decision means for comparing contents of data items in a plurality of data files referenced by said program to thereby determine identity of said data items;
   (b) determination means responsive to an output of said decision means for determining one standardized name for the data items having identity of the contents;
   (c) retrieving means, operatively associated with said decision means, for finding a division of said program which refers to the data items having identity; and
   (d) replacing means, operatively associated with said retrieving means, for replacing the names of the data items having identity found by said decision means with a standardized data name for said program.

2. The system for standardizing names of data according to claim 1, wherein said decision means includes search means for searching a data file definition division of said program to find data transfer or data comparison command instructions referencing the data items.

3. The system for standardizing names of data according to claim 1, wherein said replacing means includes means for attaching an associated data file name other than said standardized data name to said standardized data name for discriminatively identifying a data file relevant to said standardized data name among different data files.

4. An intra/inter-program data name unifying system, comprising:
   decision means for deciding whether a plurality of intrafile data items have a mutually identical content by analyzing a program;
   retrieval means, operatively associated with said decision means, for retrieving a division of each program which refers to the data items decided by said decision means as having the mutually identical content; and,
   replacing means, operatively associated with said retrieval means, for replacing names of the data items retrieved by said retrieval means with a standardized data name selectively designated by a user.

5. The intra/inter-program data name unifying system according to claim 4, further comprising:
   means for extracting from said program attributes comprising digit number and types of the data items decided as having identical content by said decision means, together with the name of said data items; and
   means, operatively associated with said extracting means, for storing said extracted attributes and said standardized data name.

6. The intra/inter-program data name unifying system according to claim 4, further including second decision means for analyzing a program to thereby identify intra-file data items whose data are mutually transferred or compared and thereby have identical content.

7. The intra/inter-program data name unifying system according to claim 4, further including third decision means for analyzing a plurality of programs to identify those intra-file data items which are identical with one another with respect to relative position in a record in a file as the data items whose contents are identical with one another.

8. The intra/inter-program data name unifying system according to claim 7, wherein said third decision means includes means for analyzing at least one job control parameter to thereby establish correspondence between names of files used by a program and physical data sets of files and identify a plurality of inter-program file names having correspondence to a common file data set represented by a single file.

9. The intra/inter-program data name unifying system according to claim 7, wherein said third decision means further identifies when lengths and attributes of the data items are mutually different indicating non-identity, and the intra/inter-program data name unifying system further includes means coupled to said third decision means for displaying to a user a group of the data items whose identity is uncertain together with information indicating uncertainty.

10. The intra/inter-program data name unifying system according to claim 4, further including means coupled to said decision means for displaying to a user a group of the data items decided as having mutually identical content.

11. The intra/inter-program data name unifying system according to claim 4 wherein said standardized data name is selectively determined in accordance with a predetermined rule.

12. In an information processing system having programs for executing a task stored in a program storage, each program accessing a data item in a data file indexed by a data name for storage and retrieval of data therein, a method for standardizing data names within the programs comprising the steps:
 detecting groups of data items having identical contents among the program within the information processing system;
 storing the detected groups of data items in an identical data item storage table;
 classifying the detected groups of data items stored in the identical data item storage table into a single group of data items having identical contents;
 displaying the single group of data items on a display unit for operator selection of a standardized data name through an input unit;
 storing the single group of data items and the selected standardized data name in a data name correspondence storage table as replacement data;
 combining the replacement data from the data name correspondence storage table with a program from the program storage, to rewrite the program as a data name standardized program accessing data items indexed by the standardized data name in place of the data name, and;
 storing the rewritten program in a data name standardized program storage.

* * * * *